INVENTOR
Walter Rosswag

April 14, 1970     W. ROSSWAG     3,505,979
DEVICE FOR AUTOMATICALLY RELEASING A CATCH FOR DOG TRAINING
Filed Aug. 11, 1967     3 Sheets-Sheet 2
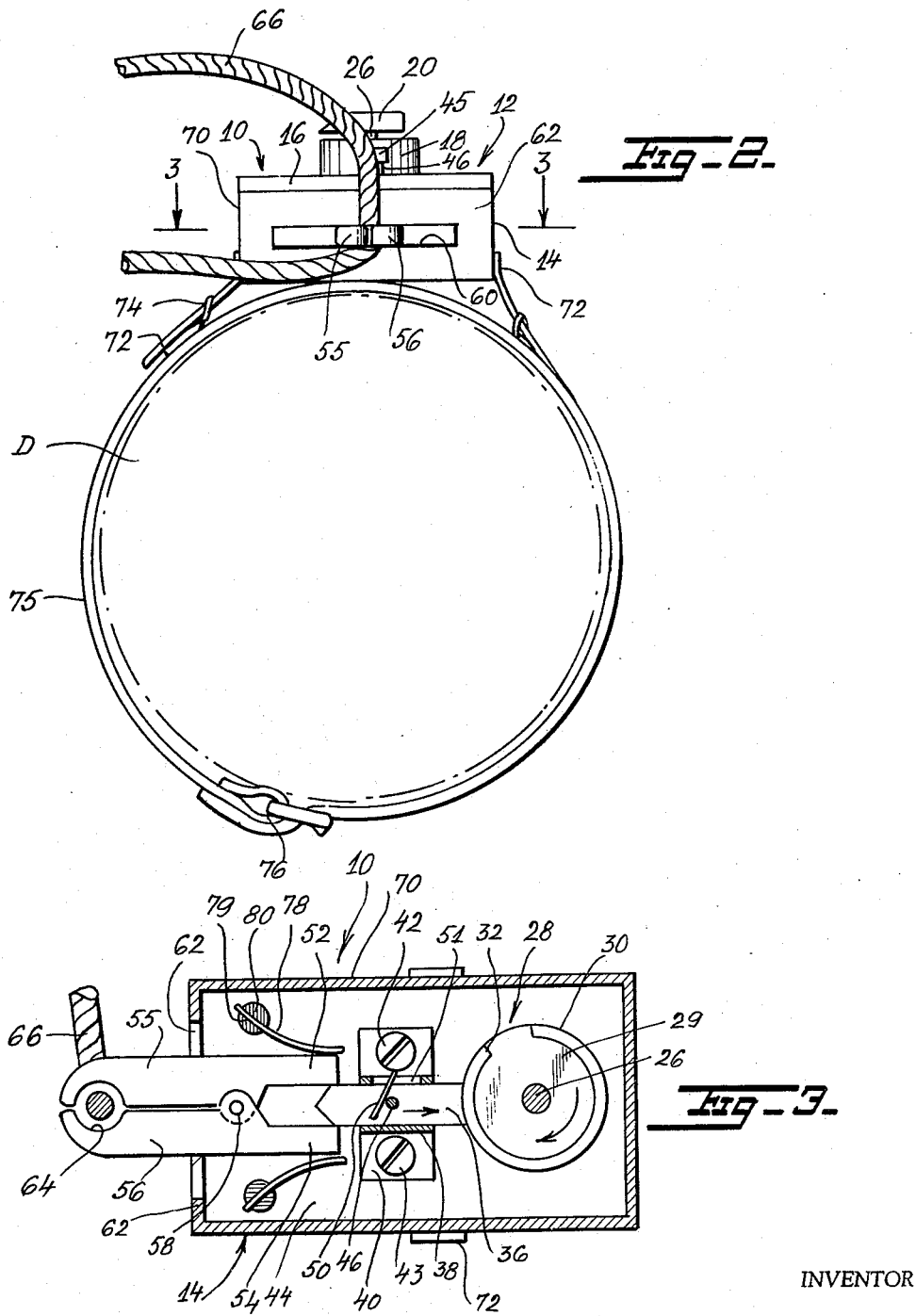
INVENTOR
Walter Rosswag
BY
ATTORNEYS

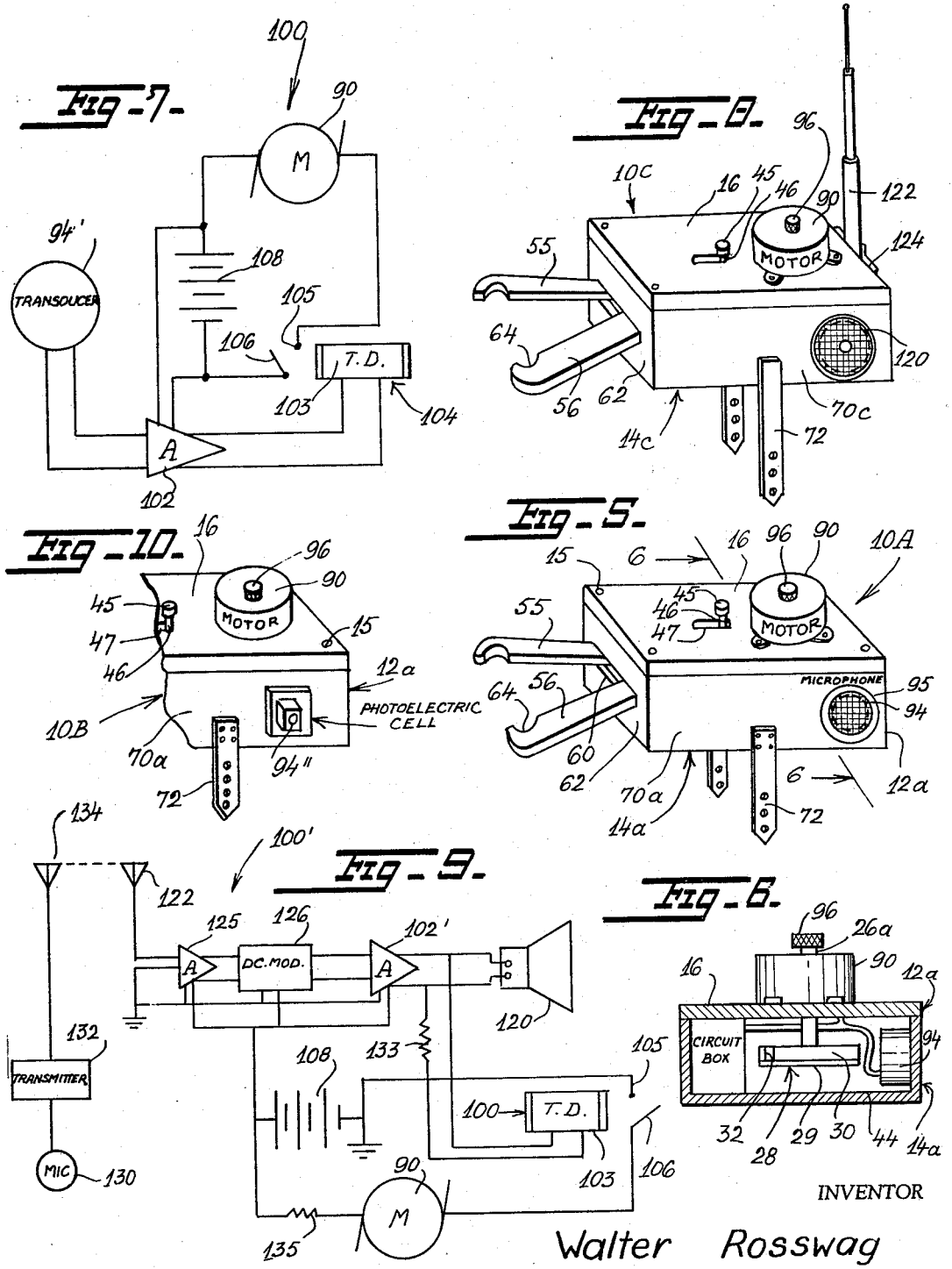

United States Patent Office 3,505,979
Patented Apr. 14, 1970

3,505,979
DEVICE FOR AUTOMATICALLY RELEASING A CATCH FOR DOG TRAINING
Walter Rosswag, Schwarzwaldstrasse 39, Wilferdingen, Germany
Filed Aug. 11, 1967, Ser. No. 660,099
Int. Cl. A01k 15/00, 29/00
U.S. Cl. 119—110          1 Claim

ABSTRACT OF THE DISCLOSURE

The disclosure describes a device used in dog training. The device has a catch manually set to engage a line or leash. The catch is released by a rotatable cam. The cam is under control by a mechanical timer or a motor. The timer or motor can be started by remote control on receipt of a signal which can be an acoustic, optical, supersonic or radio signal. Relay controlled circuitry in the device opens the catch on receipt of the signal.

---

The invention relates to dog training devices and more particularly concerns a device for automatically releasing a tethered line holding a dog at a predetermined position.

In dog training procedures the teaching of independent acts to dogs is especially difficult. Often a dog must remain at a certain location while his trainer goes out of sight and scenting distance so that the dog must be left on his own. Heretofore there has been no convenient way of restraining the dog while his trainer goes away. Some times the trainer employs an assistant to hold the dog's leash while the trainer goes out of sight. This is not desirable in many cases since it is required that the dog be left completely alone. Also a trainer frequently has no assistant available. Furthermore, when the trainer is out of sight he has no convenient way of signaling to his assistant so that the dog is not aware of the signal; also he cannot signal to the dog. The present invention overcomes the above and other difficulties of similar character heretofore encountered in dog training.

According to the invention, a dog is secured by a line engaged by a catch in a device embodying the invention. The trainer can go out of sight and scenting distance so that the dog is left entirely on its own. After a time the device releases the line automatically so that the dog is now free and able to act independently. The dog will or should take up the trail or scent of the trainer and find him or should perform some other prescribed act. The release of the line can be effected mechanically after a certain time by means of an adjustable preset mechanical timer. Alternatively, the release can be effected upon receipt of an acoustic, optical, supersonic or radio signal. The device includes a transducer which reacts selectively to a whistle or other signal of certain pitch. After electronic amplification and relay operation the line is released. The signal can be such that the dog sees or hears it and is thus aware the line is being released.

The transducer can be a microphone responsive to audio frequency or supersonic frequency signals. It can be a photoelectric cell responsive to optical signals. The optical signals can be such that they are not perceived by the dog. As a further alternative radio signals can be given which are received by wireless at the device and are then used to release the line holding the dog. The device can be equipped with a radio receiver having a loudspeaker so that further commands can be sent by radio to the dog after he is released. The device can be arranged so that it can be carried conveniently by the dog. The device may have a self-contained power supply.

It is therefore a principal object of the invention to provide a device for automatically releasing a catch holding a line which is restraining a dog, the device having means for releasing the catch after a certain period of time or upon receipt of an accoustic, supersonic, optical or radio signal.

A further object is to provide a device as described, wherein the means for releasing the catch is a manually adjustable timer having a cam to trip the catch after a set time.

Another object is to provide a device as described, wherein the means for releasing the catch is a relay controlled solenoid, switch or motor triggered by a signal responsive transducer.

Another object is to provide a device as described, wherein the transducer is a microphone responsive to audio-frequency or supersonic frequency compression air wave signals, a photoelectric cell responsive to optical signals, or a radio receiver responsive to modulated radio signals.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 2 is an enlarged front and elevational view of the device and dog collar and part of the tethered line, with jaws of the line catch shown closed.

FIG. 3 is a horizontal sectional view taken on line 3—3 of FIG. 2.

FIG. 5 is a perspective view of another device embodying another form of the invention.

FIG. 6 is a cross sectional view taken on line 6—6 of FIG. 5.

FIG. 7 is a diagram of an electric circuit employed in the device of FIGS. 5 and 6.

FIG. 8 is a perspective view of a further device embodying a further form of the invention.

FIG. 9 is a diagram of the electric circuit employed in the device of FIG. 8.

FIG. 10 is a fragmentary perspective view of another device embodying still another form of the invention.

Figure 1:
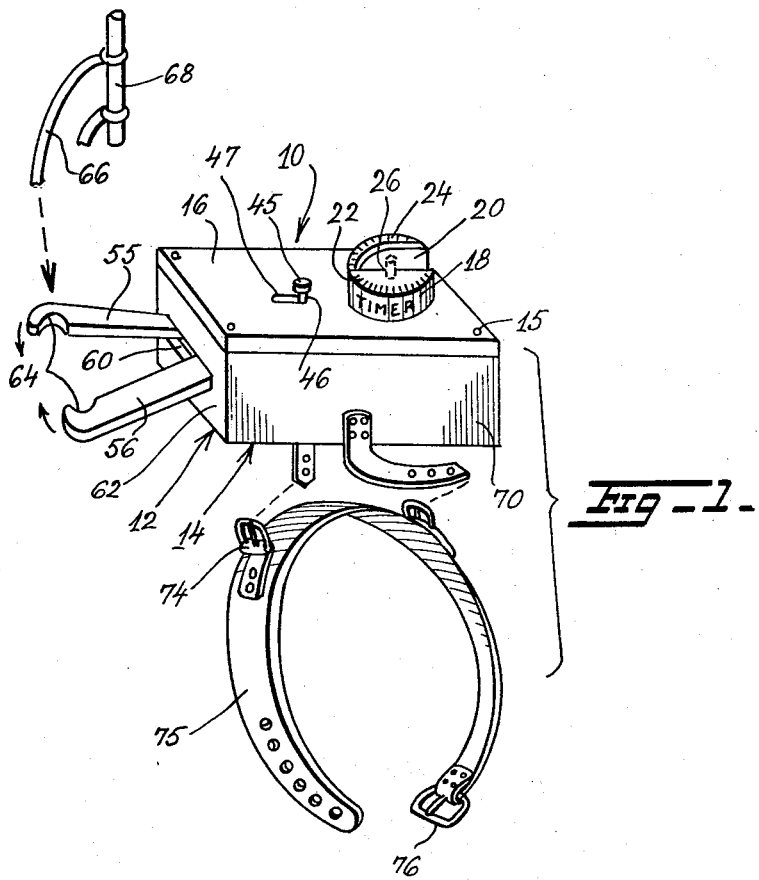
FIGURE 1 is a perspective view of a device embodying the invention, shown with jaws of a line catch in open position, an associated collar of a dog and a tethered line also being shown.
Figure 4:
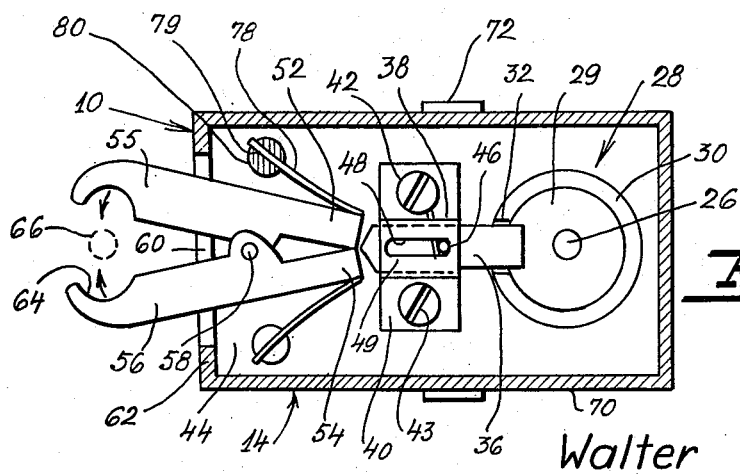
FIG. 4 is a sectional view similar to FIG. 3, but with jaws of the line catch shown open.

Referring first to FIGS. 1–4, there is shown solely by way of example, the device 10 which has a small box or casing 12 comprising a base 14 and cover 16. The cover is removably mounted by screws 15 on the base. Mounted on the cover is a mechanical spring timer 18 having a rotatable handle 20 which can be set at any desired index mark 22 on the dial 24 of the timer. When the handle is turned from its zero setting shown in FIG. 1 and then released the handle will be turned back to its zero setting in a time determined by the magnitude of its initial angular setting. The handle is joined to a shaft 26 which rotates with the handle. The shaft extends through the cover 16 in the base 14. Inside the base, the shaft 26 carries a cylindrical cam 28 having a circular bottom 29 engaged with shaft 26 and a cylindrical wall 30. A gap 32 is formed in the wall 30. This gap is wide enough to receive slidable bolt 36. The bolt slides longitudinally in a guide channel 38 having flanges 40 secured by screws 42, 43 to the bottom 44 of the base.

A pin 46 is fixed in the bolt and extends through a slot 48 formed in the top 49 of channel 38 and through a slot 47 in cover 16. A knob 45 is provided on pin 46.

A wire spring 50 is engaged at one end on screw 42. The other free end of spring 50 bears against the front side of pin 46 and tends to urge the bolt rearwardly into contact with the smooth wall 30 of the rotating cam 28; see FIG. 3. The spring extends through a slot 51 in one side of channel 38.

Bolt 36 slidably engages between rear free ends 52, 54 of jaws 55, 56. The jaws are pivotally engaged by a pin 58 set in the bottom of the base. The jaws extend outwardly through a slot 60 in the front end wall 62 of the base. Facing sides of the jaws are formed with recesses or notches 64. A line 66 can be engaged in the notches between the jaws. The line will be tethered at opposite ends to a stationary peg or post 48. At the opposite side walls 70 of the base are straps 72 which can be engaged in buckles 74 secured in spaced positions on a body strap or neck collar 75. The collar has a buckle 76 by means of which it can be secured to the body or neck of a dog D. By this arrangement the device can be carried conveniently on the dog's back or neck. The dog will hear the timer clicking and will hear the jaws 55, 56 snap open.

The jaws are opened by leaf springs 78 engaged in slots 79 in posts 80 mounted inside the base near opposite side walls. Free ends of spring 78 bear against rear ends 52, 54 of the jaws.

The device will normally be set by hand. The jaws will be closed manually to engage line 66 and the pin 46 projecting out of slot 47 in the cover will be moved forwardly to insert the front end of the bolt between the open rear ends of the jaws. Handle 20 is rotated away from its zero position. This is substantially the position of the parts shown in FIG. 3. The bolt is positioned forwardly against tension spring 50. The spring biases the bolt rearwardly in slidable contact with wall 30 of cam 28. Thus as the cam rotates, jaws 55, 56 remain closed. When gap 32 again registers with bolt 36 the bolt moves into the gap and the jaws are cleared to open and release the line 66; see FIG. 4.

The device 10A shown in FIGS. 5 and 6 is generally similar to device 10 and corresponding parts are identically numbered. In device 10A, there is provided electric motor 90 in place of timer 18 used in device 10. A microphone 94 is provided inside the base 14a of casing 12a. This microphone is exposed at screened opening 95 at one side 70a of the base. A knob 96 is provided on shaft 26a of motor 90 for turning the cam 28 so that gap 32 will be out of alignment with the bolt holding catch jaws 55 and 56 in open position.

FIG. 7 shows circuit 100 employed in device 10A. A transducer 94' which can be microphone 94 is connected to the input of a transistorized amplifier 102 whose output is connected to coil 103 of time delay relay 104. Normally open contacts 105, 106 of the relay are connected in series with motor 90 and batteries 108. The amplifier is also energized by batteries 108. The batteries, relay and amplifier are disposed in circuit box 110 inside of base 14a shown in FIG. 6.

In operation of device 10A including circuit 100, suppose transducer 94' is a microphone responsive to acoustic signals. The trainer of the dog held by the line engaged in closed jaws 55, 56 will sound a whistle. This will be heard by the dog. The sound will also be picked up by the microphone and applied to amplifier 102. The relay will become energized and contacts 105, 106 will be closed. The relay is preferably one which closes its contacts instantly but requires a predetermined time to open them again. During the time the contacts 105, 106 are closed, motor 90 will turn cam 28 until gap 32 registers with the bolt holding jaws 55, 56 open. The bolt retracts and the jaws open to release the engaged line. The relay will remain closed long enough for cam 28 to complete one turn, then the relay opens to deenergize the motor. A few seconds will suffice for release of the catch jaws after the acoustic signal is received by microphone 94.

The transducer 94' can be a supersonic microphone responsive to superaudio signals. The dog can hear such a signal although it may not be audible to human beings. The device 10A including circuit 100 will operate in the same way regardless of whether the signals are acoustic or supersonic compression air waves.

FIG. 10 shows another device 10B which is similar to device 10A and corresponding parts are identically numbered. The microphone is replaced by a photoelectric cell 94" responsive to visible or invisible light rays. An optical signal can be applied to activate the photoelectric cell. Circuit 100 can be used for device 10B with the photoelectric cell 94" serving as transducer 94'. An optical signal received by the photoelectric cell will be converted to an electrical pulse applied to amplifier 102. Operation of the system will then be the same as described above in connection with FIGS. 5–7 and the jaws 55, 56 will open a predetermined short time after the optical signal is received by photoelectric cell 94". The use of optical signals not perceivable by the dog may be preferable if it is not desired that the dog be aware of the emission and reception of the signal.

FIG. 8 shows another device 10C which is generally similar to devices 10A and 10B and corresponding parts are identically numbered. A loudspeaker 120 is provided at side 70c of base 14c. A telescopic antenna 122 for reception of radio signals is secured by bracket 124 to the back end of casing 12c.

FIG. 9 shows circuit 100' employed in device 10C. This circuit is similar to circuit 100. Motor 90 is connected in series with normally open contacts 105, 106 of time delay relay 104 and batteries 108. The coil 103 of relay 104 is connected to the output of audio amplifier 102'. Loudspeaker 120 is also connected to the output of amplifier 102' in parallel with coil 103. Antenna 122 is connected to the input of a tuned radio frequency amplifier 125 which drives a demodulator 126. The demodulator is connected to the input of amplifier 102'. The amplifiers 102', 125 and modulator 126 are all energized by batteries 108.

In operation of device 10C including circuit 100', the dog trainer will speak an audio signal into his microphone 130 which drives his radio transmitter 132. A modulated radio signal emitted by his transmitting antenna 134 will be picked up by remote receiving antenna 122, amplified by amplifier 125 and demodulated by demodulator 126. The demolulated signal will be heard by the dog via loudspeaker 120. This demodulated signal will also close time delay relay 104 and motor 90 will be energized until the catch jaws 55, 56 open. Now the dog will be released. Since he carries the device 10C on his body, he can hear from the loudspeaker any subsequent commands the dog trainer will transmit via radio to device 10C. Such subsequent commands may result in closing relay 104 but this will have no adverse affect on the relay since current limiting resistor 133 in series with coil 103 limits the current therethrough. Resistor 135 in series with the motor 90 will prevent excessive current from passing through the motor when relay contacts 105, 106 close. The motor will be prevented from operating during receipt of subsequent commands because the cam attached to the motor shaft will be held against rotation by the retracted bolt of the catch mechanism; see FIG. 4.

The devices 10, 10A and 10B have the advantage of relative simplicity, but the device 10C has the advantage of greater versatility since the dog can be kept under the trainer's control by spoken commands even through the trainer is out of sight and scent of the dog.

Having thus described my invention, what I claim as new, and desire to secure by United States Letters Patent is:

1. A dog training device comprising catch means settable to engage a tethered line, means for actuating the catch means to release the line, said actuating means comprising a manually settable timer so that the line is released at a predetermined time after the timer is set, said catch means comprises a support, a pair of spring biased pivotable jaws carried by said support and arranged to engage said lines, a spring biased slidable bolt disposed to hold the jaws closed, a cam rotatably carried by said support and disposed to keep the bolt engaged with the jaws except when the cam is at a certain open position, said timer comprising a rotatable shaft connected to the cam for rotating the same until the cam arrives as said open position when the bolt retracts from the jaws to permit the same to open and disengage the said line.

References Cited
FOREIGN PATENTS 88,791   3/1937   Sweden.

HUGH R. CHAMBLEE, Primary Examiner

U.S. Cl. X.R.

119—29